United States Patent [19]

Kumar et al.

[11] Patent Number: 5,463,869
[45] Date of Patent: Nov. 7, 1995

[54] INTEGRATED ADSORPTION/CRYOGENIC DISTILLATION PROCESS FOR THE SEPARATION OF AN AIR FEED

[75] Inventors: Ravi Kumar, Allentown; William T. Kleinberg, Breingsville, both of Pa.

[73] Assignee: Air Products and Chemicals, Inc., Allentown, Pa.

[21] Appl. No.: 289,462

[22] Filed: Aug. 12, 1994

[51] Int. Cl.[6] .................................... F25J 3/02
[52] U.S. Cl. .................... 62/24; 62/18; 62/31; 62/38; 62/39
[58] Field of Search .................................. 62/18, 24, 31, 62/38, 39

[56] References Cited

U.S. PATENT DOCUMENTS

| | | | |
|---|---|---|---|
| 3,967,464 | 7/1976 | Cormier et al. | 62/39 X |
| 4,249,915 | 2/1981 | Sircar et al. | 62/18 X |
| 4,557,735 | 12/1985 | Pike | 62/31 X |
| 4,560,397 | 12/1985 | Cheung | 62/31 X |
| 4,934,148 | 6/1990 | Prasad et al. | 62/24 |
| 5,116,396 | 5/1992 | Prasad et al. | 62/24 |
| 5,156,657 | 10/1992 | Jain et al. | 55/26 |
| 5,355,681 | 10/1994 | Xu | 62/38 X |
| 5,363,657 | 11/1994 | Naumovitz | 62/39 |
| 5,379,598 | 1/1995 | Mostello | 62/24 |
| 5,957,523 | 9/1990 | Zarate et al. | 62/24 X |

Primary Examiner—Christopher Kilner
Attorney, Agent, or Firm—Robert J. Wolff

[57] ABSTRACT

An integrated adsorption/cryogenic distillation process is set forth for the separation of an air feed. The air feed is passed through a vacuum swing adsorption (VSA) unit to remove impurities comprising water and carbon dioxide which will freeze out at cryogenic temperatures. The VSA sequence includes an adsorbent regeneration step whereby the impurity-saturated adsorbent is purged under vacuum with a purge gas. The resulting impurity-depleted air feed is fed to a cryogenic distillation column for rectification into a gaseous nitrogen overhead and a liquid oxygen bottoms. A waste stream from the distillation column is expanded, warmed against the impurity-depleted air feed to recover its refrigeration and subsequently recycled as the purge gas to the VSA unit. A key to the present invention is that the waste stream is expanded to the required sub-ambient pressure level in the cryogenic portion of the process. This enables one to recover all of the available refrigeration from the cryogenic waste stream prior to using such waste stream as the purge gas for the adsorption portion of the process.

4 Claims, 2 Drawing Sheets

INTEGRATED ADSORPTION/CRYOGENIC DISTILLATION PROCESS FOR THE SEPARATION OF AN AIR FEED

FIELD OF THE INVENTION

The present invention relates to an integrated adsorption/cryogenic distillation process for the separation of an air feed wherein (1) the air feed is passed through a vacuum swing adsorption (VSA) unit to remove impurities comprising water and carbon dioxide which will freeze out at cryogenic temperatures, (2) the VSA sequence includes an adsorbent regeneration step whereby the impurity-saturated adsorbent is purged under vacuum with a purge gas, (3) the resulting impurity-depleted air feed is fed to a cryogenic distillation column system for rectification into a gaseous nitrogen overhead and a liquid oxygen bottoms and (4) a waste stream from the distillation column system is warmed against the impurity-depleted air feed to recover its refrigeration and subsequently recycled as purge gas for the VSA unit.

BACKGROUND OF THE INVENTION

An integrated adsorption/cryogenic distillation process for the separation of an air feed wherein (1) the air feed is passed through a vacuum swing adsorption (VSA) unit to remove impurities comprising water and carbon dioxide which will freeze out at cryogenic temperatures, (2) the VSA sequence includes an adsorbent regeneration step whereby the impurity-saturated adsorbent is purged under vacuum with a purge gas, (3) the resulting impurity-depleted air feed is fed to a cryogenic distillation column system for rectification into a gaseous nitrogen overhead and a liquid oxygen bottoms and (4) a waste stream from the distillation column system is warmed against the impurity-depleted air feed to recover its refrigeration and subsequently recycled as purge gas for the VSA unit is taught in the art. Specifically, U.S. Pat. No. 5,156,657 by Jain et al. teaches such a process. Because the adsorption portion of the process uses a vacuum purge step instead of the conventional ambient pressure purge step, a key advantage of the process is that the purge gas requirement is significantly reduced or, at the same purge gas consumption, the adsorbent bed size is significantly reduced. This is important when only a small quantity of waste from the cryogenic distillation portion of the process is available for purging purposes.

There is a concern with Jain, however, in that Jain does not recover all of the available refrigeration from the cryogenic waste stream prior to recycling such waste stream as the purge gas for the VSA unit. This concern stems from the positioning of the expansion of Jain's cryogenic waste stream to the sub-ambient pressure level which expansion is required before such waste stream can be used as the purge gas for the VSA unit. Specifically, such expansion in Jain is performed after the waste stream is warmed against the air feed to the cryogenic portion of the process. As a result, the refrigeration that is obtained upon expansion of the waste stream is not recovered in the cryogenic portion of the process but instead is largely wasted in the adsorption portion of the process. It is an object of the present invention to address this concern by performing the expansion of the cryogenic waste stream before the waste stream is warmed against the air feed to the cryogenic portion of the process.

SUMMARY OF THE INVENTION

The present invention is an integrated adsorption/cryogenic distillation process for the separation of an air feed. The air feed is passed through a vacuum swing adsorption (VSA) unit to remove impurities comprising water and carbon dioxide which will freeze out at cryogenic temperatures. The VSA sequence includes an adsorbent regeneration step whereby the impurity-saturated adsorbent is purged under vacuum with a purge gas. The resulting impurity-depleted air feed is fed to a cryogenic distillation column for rectification into a gaseous nitrogen overhead and a liquid oxygen bottoms. A waste stream from the distillation column is expanded, warmed against the impurity-depleted air feed to recover its refrigeration and subsequently recycled as the purge gas for the VSA unit. A key to the present invention is that the waste stream is expanded to the required sub-ambient pressure level in the cryogenic portion of the process. This enables one to recover all of the available refrigeration from the cryogenic waste stream prior to using such waste stream as the purge gas for the adsorption portion of the process.

DETAILED DESCRIPTION OF THE INVENTION

The present invention is an integrated adsorption/cryogenic distillation process for the separation of an air feed comprising the steps of:

(a) compressing the air feed to an elevated pressure;

(b) pretreating the compressed air feed to remove impurities comprising carbon dioxide and water by an adsorption separation sequence which includes:

(i) an adsorption step consisting of passing the compressed air feed through an adsorption zone containing one or more adsorbents selective for the retention of the impurities to produce an impurity-saturated adsorption zone and an impurity-depleted air feed; and (ii) a sub-ambient pressure purge step consisting of purging the impurities from the impurity-saturated adsorption zone at a sub-ambient pressure level with a purge gas;

(c) cooling the impurity-depleted air feed to near its dew point;

(d) introducing the cooled, impurity-depleted air feed into a cryogenic distillation column system in which the cooled, impurity-depleted air feed is rectified into a gaseous nitrogen overhead and a liquid oxygen bottoms (e) withdrawing a waste stream from the distillation column system;

(f) expanding the waste stream to approximately the sub-ambient pressure level in step (b) (ii);

(g) warming the expanded waste stream against the impurity-depleted air feed, thereby accomplishing at least a portion of step (c)'s cooling of the impurity-depleted air feed; and finally (h) recycling the warmed, expanded waste stream as the purge gas in step (b)(ii).

The process of the present invention is best illustrated with reference to specific embodiments thereof such as the embodiments depicted in FIGS. 1 and 2.

Figure 1:
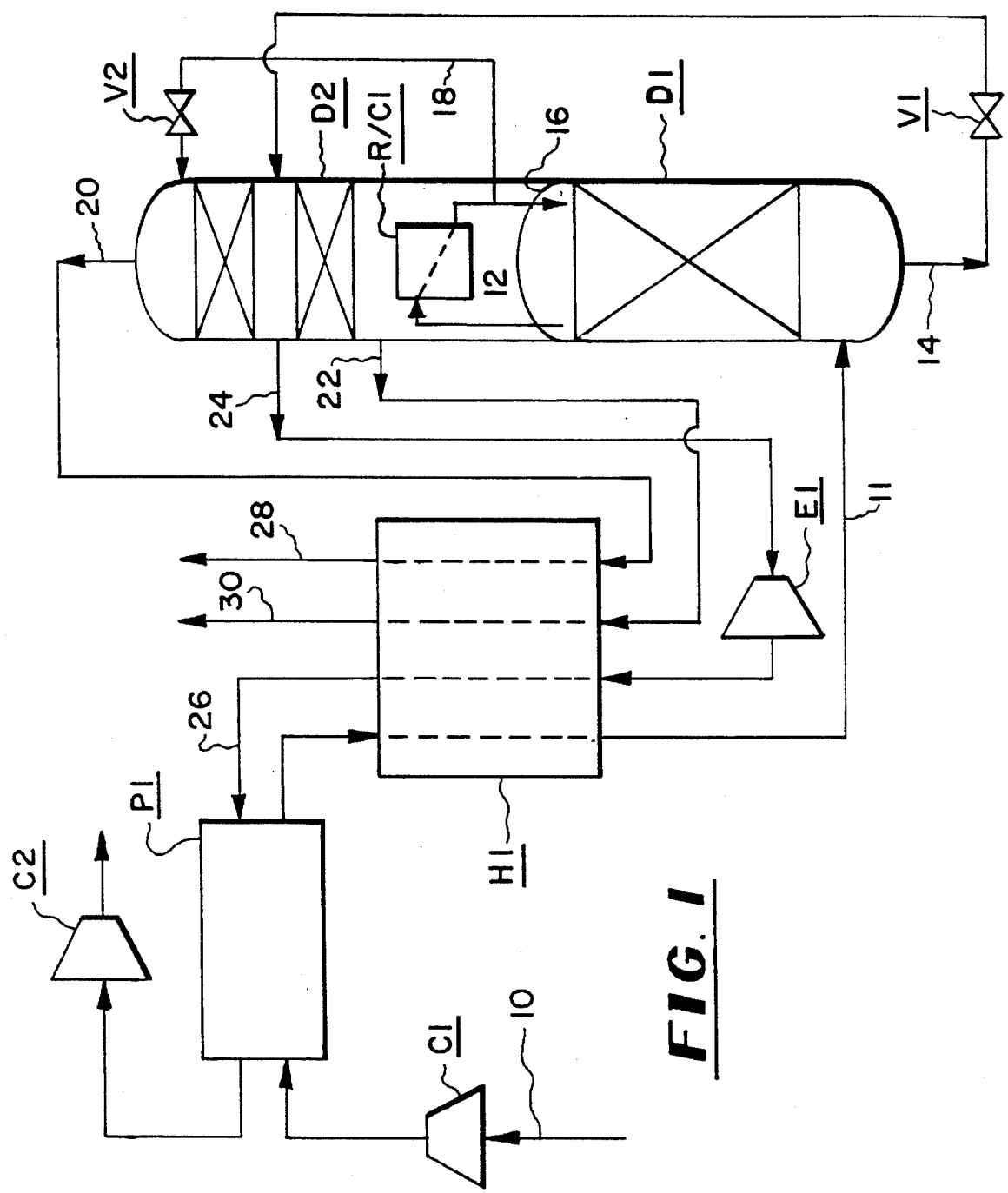
FIG. 1 is a schematic diagram of one embodiment of the present invention.

Referring now to FIG. 1, an air feed in line 10 is compressed to an elevated pressure in compressor C1. The compressed air feed is pretreated in pretreater P1 to remove impurities comprising carbon dioxide and water by an adsorption separation sequence which, at a minimum, includes selective adsorption of the impurities by an adsorbent and subsequent purging of the impurities from the adsorbent at a sub-ambient pressure level with a purge gas.

Following the pretreater, the impurity-depleted air feed is cooled to near its dew point in front end heat exchanger H1. The cooled, impurity-depleted air feed in line 11 is then introduced into a cryogenic distillation column system comprising high pressure column D1 and low pressure column D2. The air feed is specifically fed to the high pressure column in which the air feed is rectified into an intermediate gaseous nitrogen overhead in stream 12 and an intermediate liquid oxygen bottoms in stream 14. The intermediate liquid oxygen bottoms is reduced in pressure across valve V1 and fed to the low pressure column in which said portion is distilled into a gaseous nitrogen overhead in line 20 and a liquid oxygen bottoms which collects in the sump of the low pressure column. The high pressure and low pressure columns are thermally integrated such that at least a portion of the intermediate gaseous nitrogen overhead is condensed in reboiler/condenser R/C 1 against vaporizing liquid oxygen bottoms. A portion of the resulting condensed intermediate gaseous nitrogen overhead is used to provide reflux for the high pressure column via line 16 while the remaining portion in line 18 is used to provide reflux for the low pressure column after being reduced in pressure across valve V2. If desired, a portion of the condensed nitrogen can also be removed as product.

The gaseous nitrogen overhead is warmed in the heat exchanger and subsequently recovered as a nitrogen product in line 28. Similarly, an oxygen-enriched stream is withdrawn from above the sump in the low pressure column via line 22, warmed in the heat exchanger and subsequently recovered as oxygen product in line 30.

A nitrogen-enriched gaseous waste stream is withdrawn from an upper intermediate location of the low pressure column in line 24 and expanded nearly isentropically across expander E1 to approximately the sub-ambient pressure level of the adsorbent purge step. The expanded nitrogen-enriched waste stream is then warmed in the heat exchanger against the impurity-depleted air feed, thereby accomplishing a portion of the cooling of the impurity-depleted air feed to its dewpoint. Finally, the warmed, expanded waste stream in line 26 is recycled as the purge gas in connection with the adsorbent purge step in the pretreater. The impurity-containing purge gas exiting the pretreater is compressed to atmospheric pressure in vacuum compressor C2 before being vented to the atmosphere.

Figure 2:
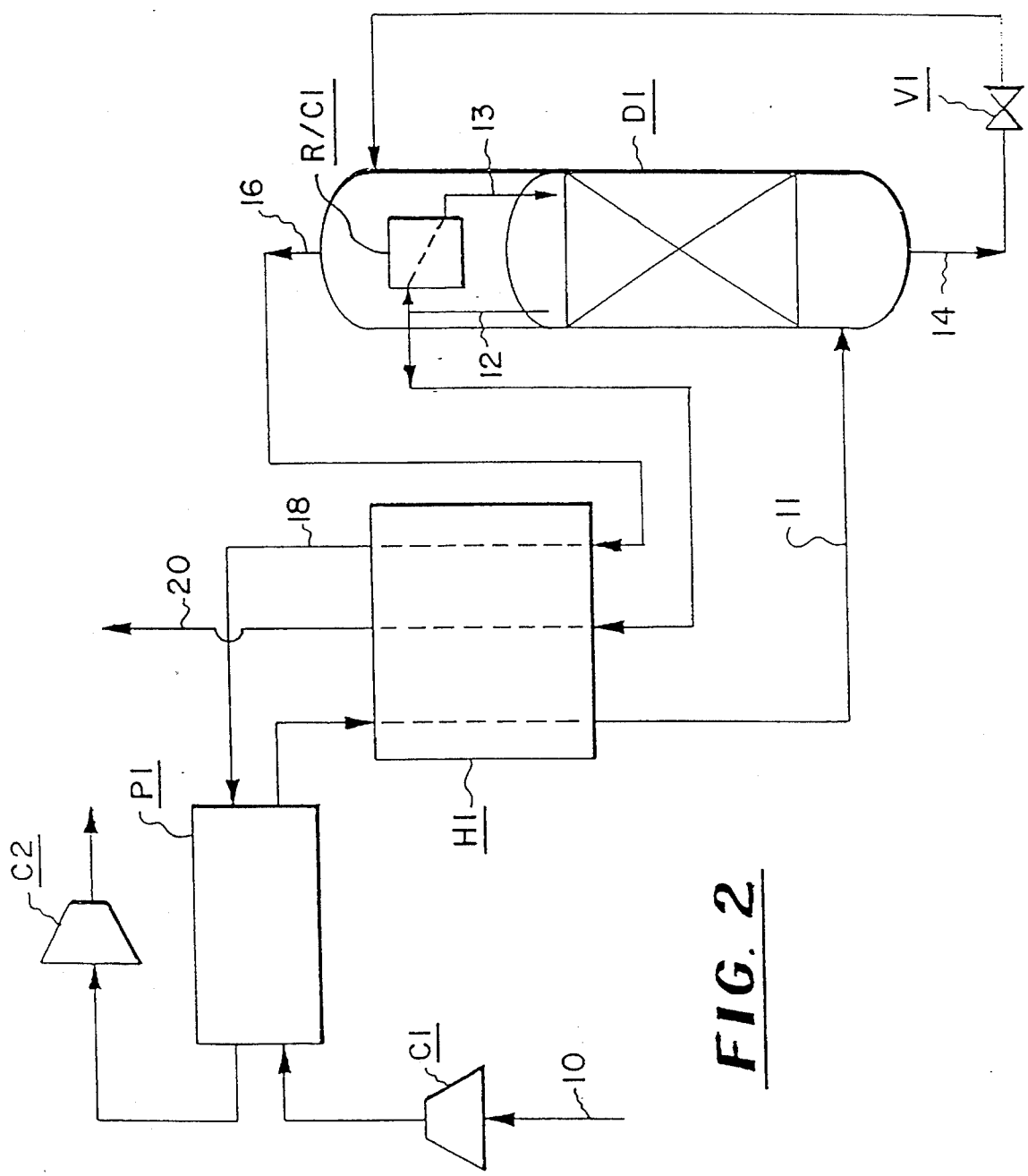
FIG. 2 is a schematic diagram of a second embodiment of the present invention.

Referring now to FIG. 2, an air feed in line 10 is compressed to an elevated pressure in compressor C1. As in FIG. 1, the compressed air feed is pretreated in pretreater P1 to remove impurities comprising carbon dioxide and water by an adsorption separation sequence which, at a minimum, includes selective adsorption of the impurities by an adsorbent and subsequent purging of the impurities from the adsorbent at a sub-ambient pressure level with a purge gas.

Following the pretreater, the impurity-depleted air feed is cooled to near its dew point in front end heat exchanger H1. The cooled, impurity-depleted air feed in line 11 is then introduced into a cryogenic distillation column system comprising a single distillation column D1 in which the air feed is rectified into a gaseous nitrogen overhead in stream 12 and a liquid oxygen bottoms in stream 14. A portion of the gaseous nitrogen overhead is warmed in the heat exchanger and subsequently recovered as a nitrogen product in stream 20.

The liquid oxygen bottoms, which constitutes the waste stream withdrawn from the distillation column system, is expanded nearly isenthalpically across valve V1 to approximately the sub-ambient pressure level of the adsorbent purge step. The expanded liquid oxygen bottoms waste stream is subsequently vaporized against liquefying gaseous nitrogen overhead in reboiler/condenser R/C 1 located at the top of the single distillation column in order to provide reflux for the single distillation column via line 13. The vaporized oxygen bottoms waste stream in line 16 is then warmed in the heat exchanger against the impurity-depleted air feed, thereby accomplishing a portion of the cooling of the impurity-depleted air feed to its dewpoint. Finally, the warmed, expanded oxygen bottoms waste stream in line 18 is recycled as the purge gas in connection with the adsorbent purge step in the pretreater. The impurity-containing purge gas exiting the pretreater is compressed to atmospheric pressure in vacuum compressor C2 before being vented to the atmosphere.

The skilled practitioner will appreciate that if additional refrigeration is needed to complete the heat balance for a particular product mix in either FIG. 1 or FIG. 2, a portion of the air feed can be expanded in an expander subsequent to at least partial cooling in the front end heat exchanger and prior to its introduction into a suitable location in the distillation column system.

It should be noted that a typical complete adsorption separation sequence in the process of the present invention would comprise:

(i) passing the compressed air feed through an adsorption zone containing one or more adsorbents selective for the retention of the impurities comprising carbon dioxide and water to produce an impurity-saturated adsorption zone and an impurity-depleted air feed;

(ii) depressurizing the adsorption zone to a sub-ambient pressure level to produce an impurity-containing effluent stream;

(iii) purging the adsorption zone at approximately the sub-ambient pressure level reached in the above depressurization step with a purge gas in order to purge the adsorption zone of the impurities still remaining in the adsorption zone at the end of the above depressurization step; and (iv) repressurizing the adsorption zone with a repressurization gas.

Preferably, the above adsorption separation sequence is carried out in a plurality of adsorption zones which each undergo their respective cycle of steps (i) through (iv) while collectively operated sequentially in parallel with one another.

It should further be noted that is also possible to integrate a membrane separator into the present invention's adsorption separation sequence. A typical integrated membrane/adsorption separation sequence would comprise:

(i) passing the compressed air feed through the membrane separator comprising a high pressure side separated from a low pressure side by a semi-permeable membrane which is selective for the permeation of water wherein the air feed is specifically introduced into the high pressure side of the membrane separator;

(ii) withdrawing the compressed air feed, now at least partially dehydrated, from the high pressure side of the membrane separator;

(iii) passing the compressed and at least partially dehydrated air feed through an adsorption zone containing one or more adsorbents selective for the retention of the impurities comprising carbon dioxide and water to produce an impurity-saturated adsorption zone and an impurity-depleted air feed;

(iv) depressurizing the adsorption zone to a sub-ambient pressure level to produce an impurity-containing effluent stream;

(v) purging the adsorption zone at approximately the sub-ambient pressure level reached in the above depressurization step with a purge gas in order to purge the adsorption zone of the impurities still remaining in the adsorption zone at the end of the above depressurization step wherein the effluent from the adsorption zone purge step is introduced into the low pressure side of the membrane separator as a sweep stream;

(vi) repressurizing the adsorption zone with a repressurization gas; and (vii) withdrawing a permeate stream enriched in water from the low pressure side of the membrane separator.

The skilled practitioner will appreciate that the present invention's adsorption separation sequence can also incorporate other steps known in the adsorption art such as one or more pressure equalization transfers between parallel beds of a multi-bed system wherein a portion of the depressurization effluent from one bed is transferred to a parallel bed as partial repressurization gas, thereby equalizing the pressures of the two beds involved in the pressure equalization transfer.

The present invention has been described with reference to two specific embodiments thereof. These embodiments should not be seen as a limitation of the scope of the present invention; the scope of such being ascertained by the following claims.

We claim:

1. An integrated adsorption/cryogenic distillation process for the separation of an air feed comprising the steps of:

(a) compressing the air feed to an elevated pressure;

(b) pretreating the compressed air feed to remove impurities comprising carbon dioxide and water by an adsorption separation sequence which includes:

(i) an adsorption step consisting of passing the compressed air feed through an adsorption zone containing one or more adsorbents selective for the retention of the impurities to produce an impurity-saturated adsorption zone and an impurity-depleted air feed; and (ii) a sub-ambient pressure purge step consisting of purging the impurities from the impurity-saturated adsorption zone at a sub-ambient pressure level with a purge gas;

(c) cooling the impurity-depleted air feed to near its dew point;

(d) introducing the cooled, impurity-depleted air feed into a cryogenic distillation column system in which the cooled, impurity-depleted air feed is rectified into a gaseous nitrogen overhead and a liquid oxygen bottoms;

(e) withdrawing a waste stream from the distillation column system;

(f) expanding the waste stream to approximately the sub-ambient pressure level in step (b)(ii);

(g) warming the expanded waste stream against the impurity-depleted air feed, thereby accomplishing at least a portion of step (c)'s cooling of the impurity-depleted air feed; and finally (h) recycling the warmed, expanded waste stream as the purge gas in step (b)(ii).

2. The process of claim 1 wherein:

(i) the distillation column system in step (d) comprises a high pressure column and a low pressure column;

(ii) the cooled, impurity-depleted air feed from step (c) is specifically fed to the high pressure column in which the air feed is rectified into an intermediate gaseous nitrogen overhead and an intermediate liquid oxygen bottoms;

(iii) the intermediate liquid oxygen bottoms is fed to the low pressure column in which said portion is distilled into step (d)'s gaseous nitrogen overhead and step (d)'s liquid oxygen bottoms;

(iv) the high pressure and low pressure columns are thermally integrated such that at least a portion of the intermediate gaseous nitrogen overhead is condensed in a reboiler/condenser against vaporizing liquid oxygen bottoms;

(v) at least a portion of the condensed intermediate gaseous nitrogen overhead is used to provide reflux for the distillation column system;

(vi) the waste stream withdrawn from the distillation column in step (e) comprises a nitrogen-enriched gaseous stream withdrawn from an upper intermediate location of the low pressure column; and (vii) the expansion in step (f) is performed nearly isentropically across an expander.

3. The process of claim 2 wherein:

(i) the distillation column system in step (d) comprises a single distillation column;

(ii) the waste stream withdrawn from the distillation column in step (e) comprises step (d)'s liquid oxygen bottoms;

(iii) the expansion in step (f) is performed nearly isenthalpically across a valve; and (iv) subsequent to step (f) and prior to step (g), the liquid oxygen bottoms is vaporized against liquefying gaseous nitrogen overhead in a reboiler/condenser located at the top of the single distillation column in order to provide reflux for the distillation column system.

4. The process of claim 1 wherein step (b)'s adsorption separation sequence comprises:

(i) passing the compressed air feed through an adsorption zone containing one or more adsorbents selective for the retention of the impurities comprising carbon dioxide and water to produce the impurity-saturated adsorption zone and the impurity-depleted air feed;

(ii) depressurizing the adsorption zone to a sub-ambient pressure level to produce an impurity-containing effluent stream;

(iii) purging the adsorption zone at approximately the sub-ambient pressure level reached in the above depressurization step with a purge gas in order to purge the adsorption zone of the impurities still remaining in the adsorption zone at the end of the above depressurization step; and (iv) repressurizing the adsorption zone with a repressurization gas.

* * * * *